(12) United States Patent
Kume et al.

(10) Patent No.: US 10,502,305 B2
(45) Date of Patent: Dec. 10, 2019

(54) ROTARY ACTUATOR

(71) Applicant: DENSO CORPORATION, Kariya, Aichi-pref. (JP)

(72) Inventors: Mikine Kume, Kariya (JP); Shinji Naito, Kariya (JP)

(73) Assignee: DENSO CORPORATION, Kariya (JP)

( * ) Notice: Subject to any disclaimer, the term of this patent is extended or adjusted under 35 U.S.C. 154(b) by 117 days.

(21) Appl. No.: 15/801,633

(22) Filed: Nov. 2, 2017

(65) Prior Publication Data

US 2018/0172133 A1    Jun. 21, 2018

(30) Foreign Application Priority Data

Dec. 20, 2016   (JP) .................. 2016-246576

(51) Int. Cl.

| | |
|---|---|
| *F16H 57/021* | (2012.01) |
| *F16H 61/32* | (2006.01) |
| *F16H 63/34* | (2006.01) |
| *F16H 57/02* | (2012.01) |
| *F16H 63/00* | (2006.01) |

(52) U.S. Cl.
CPC .......... *F16H 57/021* (2013.01); *F16H 61/32* (2013.01); *F16H 63/3425* (2013.01); *F16H 63/3466* (2013.01); *F16H 2057/02034* (2013.01); *F16H 2061/326* (2013.01); *F16H 2063/005* (2013.01)

(58) Field of Classification Search
CPC ...... F16H 57/021; F16H 57/023; F16H 61/32; F16H 2057/02034; F16H 63/3425; F16H 63/3466

See application file for complete search history.

(56) References Cited

U.S. PATENT DOCUMENTS

| | | | | |
|---|---|---|---|---|
| 5,295,413 A | * | 3/1994 | Sherman .................. | B60K 1/00 74/421 A |
| 2009/0189468 A1 | * | 7/2009 | Kume ..................... | H02K 1/148 310/83 |
| 2010/0170355 A1 | * | 7/2010 | Kume ..................... | F16H 61/32 74/63 |
| 2013/0217531 A1 | * | 8/2013 | Kume ..................... | H02K 5/04 475/149 |

FOREIGN PATENT DOCUMENTS

JP         5648564        1/2015

* cited by examiner

*Primary Examiner* — Stacey A Fluhart
(74) *Attorney, Agent, or Firm* — Nixon & Vanderhye P.C.

(57) ABSTRACT

A rotary actuator includes a front housing, a middle housing, and a rear housing. The middle housing has an annular part, a front side extension part extending from the annular part toward the front housing, a rear side extension part extending from the annular part toward the rear housing, a plurality of front side convex parts projected from an outer circumference wall of the front side extension part outward in the radial direction to be in contact with an inner wall of the front housing, and a plurality of rear side convex parts projected from an inner circumference wall of the rear side extension part inward in the radial direction to be in contact with an outer edge part of the stator.

7 Claims, 14 Drawing Sheets

ROTARY ACTUATOR

CROSS REFERENCE TO RELATED APPLICATION

This application is based on Japanese Patent Application No. 2016-246576 filed on Dec. 20, 2016, the disclosure of which is incorporated herein by reference in its entirety.

TECHNICAL FIELD

The present disclosure relates to a rotary actuator.

BACKGROUND

Conventionally, in a shift range change device of a vehicle, an electronic control unit detects the shift range selected by the driver, and drives and controls a rotary actuator according to the detection value, such that the shift range of an automatic shift is changed in a shift-by-wire system. JP 5648564 B describes a shift-by-wire system.

SUMMARY

In the shift-by-wire system of JP 5648564 B, an output unit of a rotary actuator is connected to a shift range change device of an automatic shift, and the shift range of the automatic shift is changeable by torque outputted from the output unit.

The rotary actuator includes three housings, e.g., a front housing, a middle housing, and a rear housing, and the output unit is rotatably disposed at the radially outer side of a motor shaft. The motor shaft has ends which are rotatably supported by the front housing and the rear housing. A gear mechanism is disposed at a side of a stator adjacent to the front housing to transmit the torque of the motor shaft to the output unit.

In the rotary actuator of JP 5648564 B, all of the outer circumference wall of the front side extension part extending from the annular part of the middle housing toward the front housing is in contact with the inner wall of the front housing. Moreover, all of the inner circumference wall of the rear side extension part extending in a cylindrical shape from the annular part of the middle housing toward the rear housing is in contact with the outer edge part of the stator. Therefore, when coefficient of linear expansion is different among the middle housing, the front housing, and the stator, if the rotary actuator is used in a high temperature environment, strong stress may be generated among the middle housing, the front housing, and the stator. Thereby, an axial misalignment may occur among the motor shaft, the stator, and the gear mechanism. As a result, friction loss among rotation components may increase at the operation time, and the torque outputted from the output unit may decrease. In order to restrict such a torque lowering, it is necessary to enlarge the size of, for example, a stator, or to increase electric current supplied to the rotary actuator.

It is an object of the present disclosure to provide a small-size rotary actuator in which a lowering in output torque and an axial misalignment among rotation components are restricted.

According to an aspect of the present disclosure, a rotary actuator includes: a front housing, a middle housing, a rear housing, a motor shaft, a stator, a rotor, a gear mechanism and an output unit. The middle housing is disposed at an opening of the front housing. The rear housing is disposed opposite from the front housing through the middle housing to define a space with the front housing and the middle housing. The motor shaft has ends rotatably supported by the front housing and the rear housing. The stator is fixed at an inner side of the rear housing in the space. The rotor is disposed at an inner side of the stator to be rotatable with the motor shaft. The gear mechanism is located in the space adjacent to the front housing relative to the stator and the rotor to transmit a torque of the motor shaft. The output unit is disposed to be rotatable at an outer side of the motor shaft in the radial direction to output the torque of the motor shaft transmitted by the gear mechanism.

The middle housing has an annular part, a front side extension part, a rear side extension part, a plurality of front side convex parts, and a plurality of rear side convex parts. The annular part is disposed at an outer side of the gear mechanism in the radial direction. The front side extension part extends from the annular part in a cylindrical shape toward the front housing and located at an outer side of the gear mechanism in the radial direction. The rear side extension part extends from the annular part in a cylindrical shape toward the rear housing and located at an outer side of the stator in the radial direction. The plurality of front side convex parts is projected from an outer circumference wall of the front side extension part outward in the radial direction to be in contact with an inner wall of the front housing. The plurality of rear side convex parts is projected from an inner circumference wall of the rear side extension part inward in the radial direction to be in contact with an outer edge part of the stator.

The middle housing has the front side convex part projected in the radial direction outward from the outer circumference wall of the front side extension part, and the front side convex part is able to be in contact with the inner wall of the front housing. Thereby, the relative position between the middle housing and the front housing is specified in a direction perpendicular to the axis. Moreover, the rear side convex part of the middle housing is projected from the inner circumference wall of the rear side extension part inward in the radial direction, and is able to be in contact with the outer edge part of the stator. Thereby, the relative position between the middle housing and the stator is specified in the direction perpendicular to the axis. Moreover, the stator is fixed to the rear housing. Therefore, the relative position between the front housing and the rear housing is specified in the direction perpendicular to the axis through the stator and the middle housing. The front housing and the rear housing support the motor shaft to be rotatable.

In case where a coefficient of linear expansion differs among the middle housing, the front housing, and the stator, when the rotary actuator is used in a high temperature environment, stress may arise among the middle housing, the front housing, and the stator. In this case, an axial misalignment may occur among the motor shaft, the stator and the gear mechanism. In the present disclosure, the plural front side convex parts of the middle housing are able to be in contact with the inner wall of the front housing, and the plural rear side convex parts are able to be in contact with the outer edge part of the stator. Therefore, the stress produced among the middle housing, the front housing, and the stator can be reduced, compared with a conventional rotary actuator in which all of the outer circumference wall of the front side extension part is in contact with the inner wall of front housing, and all of the inner circumference wall of the rear side extension part is in contact with the outer edge part of the stator. Thereby, the axial misalignment can be restricted from being generated among the motor shaft, the stator and the gear mechanism. Because increase in friction loss among the rotation components at the operation time can be reduced, the torque outputted from the output unit can be restricted from decreasing. Therefore, it is not necessary to enlarge the size of the stator or to increase the current supplied to the rotary actuator in consideration of the fall in the torque resulting from the axial misalignment among the rotation components. Therefore, the output torque can be increased without enlarging the size of the rotary actuator or increasing power consumption at the operation time.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
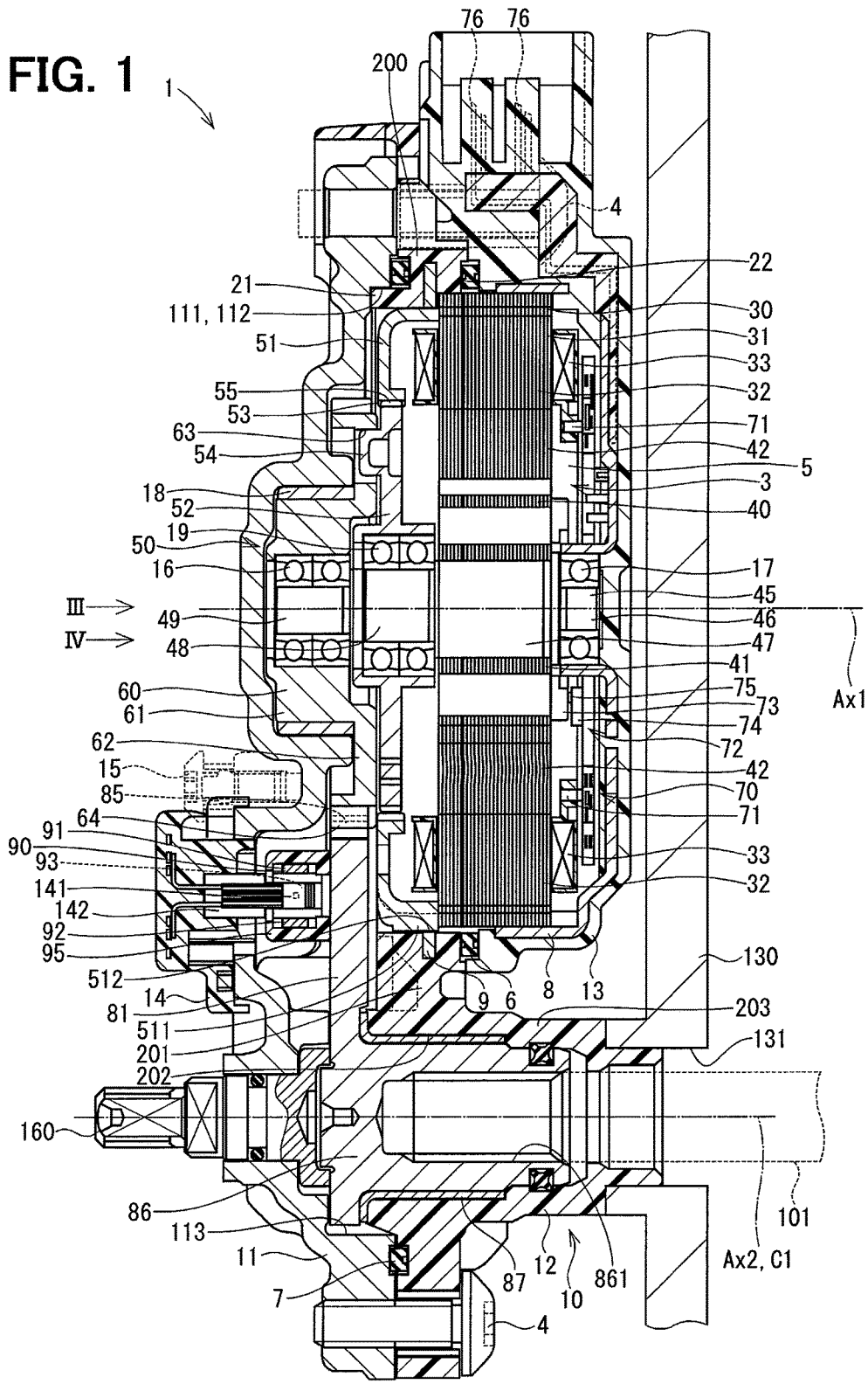
FIG. 1 is a sectional view illustrating a rotation drive device according to a first embodiment.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A rotary actuator 1 shown in FIG. 1 is used, for example, as an actuator of a shift-by-wire system which changes a shift of an automatic shift of a vehicle.

Figure 2:
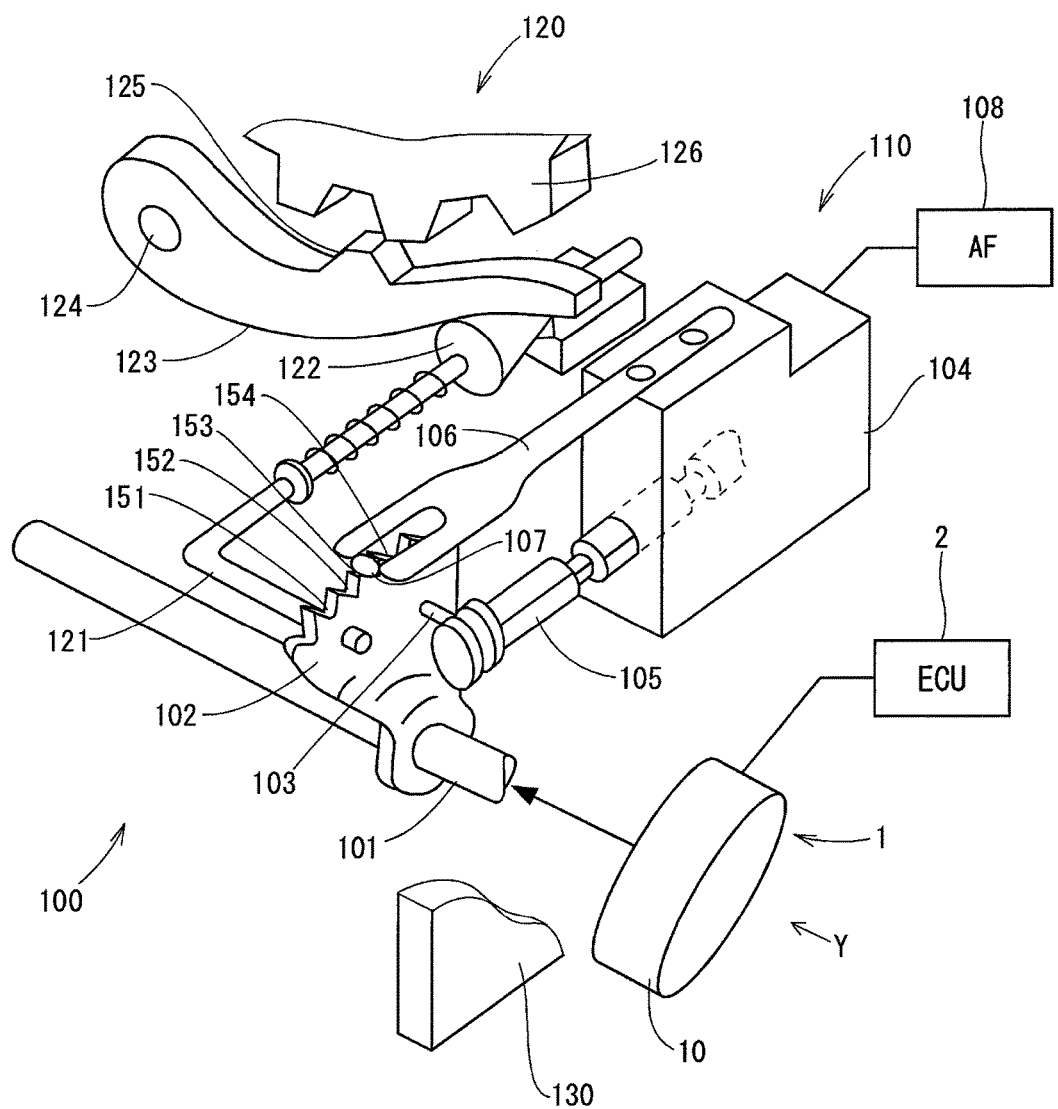
FIG. 2 is a schematic view illustrating a shift-by-wire system to which the rotation drive device of the first embodiment is applied.

First, the shift-by-wire system is explained. As shown in FIG. 2, a shift-by-wire system 100 includes an electronic control unit (ECU) 2, a shift range transfer device 110, and a parking transfer device 120 in addition to the rotary actuator 1. The rotary actuator 1 rotates a manual shaft 101 of the shift range transfer device 110 which is a drive target, thereby changing the shift range of an automatic shift 108. The rotation of the rotary actuator 1 is controlled by ECU 2. The rotary actuator 1 is attached to, for example, a wall part 130 of the shift range transfer device 110 which is an attachment target. In addition, the rotary actuator 1 drives the manual shaft 101 of the shift range transfer device 110 to rotate, so as to drive, for example, a park rod 121 of the parking transfer device 120.

The shift range transfer device 110 includes the manual shaft 101, a detent plate 102, an oil pressure valve body 104, and the wall part 130. The wall part 130 houses the manual shaft 101, the detent plate 102, and the oil pressure valve body 104. The manual shaft 101 passes through a hole part 131 (refer to FIG. 1) defined in the wall part 130, and one end of the manual shaft 101 is projected from the wall part 130.

The one end of the manual shaft 101 is spline-combined to an output unit 86 of the rotary actuator 1 (to be mentioned later). The detent plate 102 has a sector shape extending from the manual shaft 101 outward in the radial direction, and rotates integrally with the manual shaft 101. A pin 103 projected in parallel with the manual shaft 101 is formed in the detent plate 102.

The pin 103 is engaged with an end of a manual spool valve 105 of the oil pressure valve body 104. For this reason, the manual spool valve 105 is reciprocated in the axial direction by the detent plate 102 which rotates integrally with the manual shaft 101. The manual spool valve 105 moves in both-way in the axial direction to change the oil pressure supply route to an oil pressure clutch of the automatic shift 108. As a result, the engagement state of the oil pressure clutch changes, and the shift range of the automatic shift 108 is changed.

The detent plate 102 has a concave portion 151, a concave portion 152, a concave portion 153, and a concave portion 154 at the end in the radial direction. The concave portions 151-154 respectively correspond to P range, R range, N range, and D range, for example, which is a shift range of the automatic shift 108. A stopper 107 supported at a tip end of a board spring 106 is engaged with either of the concave portions 151-154 of the detent plate 102, and the position of the manual spool valve 105 is determined in the axial direction.

When torque is added to the detent plate 102 via the manual shaft 101 from the rotary actuator 1, the stopper 107 moves to the adjacent concave portion (either of the concave portions 151-154). Thereby, the position of the manual spool valve 105 changes in the axial direction.

For example, in case where seen from the arrow direction Y of FIG. 2, when the manual shaft 101 is rotated clockwise, the pin 103 presses the manual spool valve 105 into the oil pressure valve body 104 through the detent plate 102, and the oil passage in the oil pressure valve body 104 is changed in order of D, N, R, and P. Thereby, the shift range of the automatic shift 108 is changed in order of D, N, R, and P.

When the manual shaft 101 is rotated counterclockwise, the pin 103 pulls out the manual spool valve 105 from the oil pressure valve body 104, and the oil passage in the oil pressure valve body 104 is changed in order of P, R, N, and D. Thereby, the shift range of the automatic shift 108 is changed in order of P, R, N, and D. Thus, the rotation angle of the manual shaft 101 rotated by the rotary actuator 1, i.e., a predetermined position in the rotational direction, corresponds to each shift range of the automatic shift 108.

The parking transfer device 120 includes the park rod 121, the park pole 123, and the parking gear 126. The park rod 121 has an approximately L-shape, and the detent plate 102 is connected to one end of the park rod 121. A cone part 122 is formed at the other end of the park rod 121. The park rod 121 converts the rotational movement of the detent plate 102 into a linear motion, and the cone part 122 reciprocates in the axial direction. The park pole 123 is in contact with a side surface of the cone part 122. Therefore, when the park rod 121 reciprocates, the park pole 123 is rotated about the axial part 124.

A protrusion part 125 is formed to protrude in the rotational direction of the park pole 123. When the protrusion part 125 is engaged with the gear of the parking gear 126, rotation of the parking gear 126 is regulated. Thereby, a driving wheel locks via a drive shaft or a differential gear (not shown). When the protrusion part 125 of the park pole 123 separates from the gear of the parking gear 126, the parking gear 126 becomes rotatable, and the driving wheel is unlocked. Next, the rotary actuator 1 is explained.

As shown in FIG. 1, the rotary actuator 1 has a housing 10, a motor 3 corresponding to a rotational electric machinery, a reduction gear 50 corresponding to a gear mechanism, an output gear 81, an output unit 86, a yoke 90, a magnet 93 as a first magnetic flux generating part, a magnet 94 as a second magnetic flux generating part, and a Hall IC 141 as a magnetic flux density detector.

The housing 10 has a front housing 11, a middle housing 12, a rear housing 13, and a sensor housing 14. The front housing 11 is formed of, for example, metal such as aluminum. The middle housing 12, the rear housing 13, and the sensor housing 14 are formed of, for example, resin.

The middle housing 12 is disposed to be in contact with an opening part of the front housing 11. The rear housing 13 is formed in a based cylindrical shape. The rear housing 13 is disposed to be in contact with a side of the middle housing 12 opposite from the front housing 11. The sensor housing 14 is formed to be in contact with a side of the front housing 11 opposite from the middle housing 12. In this embodiment, the rotary actuator 1 is attached to the wall part 130 so that the wall part 130 of the shift range transfer device 110 opposes a surface of the rear housing 13 opposite from the front housing 11.

The front housing 11 and the rear housing 13 are fixed with a bolt 4 in a state where the middle housing 12 is interposed between the front housing 11 and the rear housing 13. Thereby, a space 5 is formed inside the front housing 11, the middle housing 12, and the rear housing 13.

An annular gasket 6 made of rubber is disposed at a contact part between the middle housing 12 and the rear housing 13, and an annular gasket 7 made of rubber is disposed at a contact part between the middle housing 12 and the front housing 11. Therefore, the passage of gas or liquid is not allowed between the inside and the outside of the space 5. The sensor housing 14 is fixed to the front housing 11 with a bolt 15.

The motor 3 is a three-phase brushless motor which generates driving force, without using a permanent magnet. The motor 3 is formed adjacent to the rear housing 13 in the space 5. That is, the motor 3 is housed in the housing 10. The motor 3 has a motor shaft 45, a stator 30, a coil 33, and a rotor 40.

The motor shaft 45 is formed of, for example, metal. The motor shaft 45 has one end part 46, a large diameter part 47, an eccentric part 48, and the other end part 49. The one end part 46, the large diameter part 47, the eccentric part 48, and the other end part 49 are formed integrally to be arranged in a direction of an axis Ax1 of the motor shaft 45 in this order.

The one end part 46 is formed cylindrical. The large diameter part 47 is formed in a column shape having an outer diameter larger than that of the one end part 46, and has the same axis (axis Ax1) as the one end part 46. The eccentric part 48 is formed in a column shape having an outer diameter smaller than that of the large diameter part 47, and is eccentric to the axis Ax1 which is a rotation center of the motor shaft 45. That is, the eccentric part 48 is formed to be eccentric to the one end part 46 and the large diameter part 47. The other end part 49 is formed in a column shape having an outer diameter smaller than that of the eccentric part 48, and has the same axis (axis Ax1) as the one end part 46 and the large diameter part 47.

The one end part 46 of the motor shaft 45 is rotatably supported by the rear bearing 17, and the other end part 49 of the motor shaft 45 is rotatably supported by the front bearing 16. In this embodiment, the front bearing 16 and the rear bearing 17 are, for example, ball bearings.

The front bearing 16 is formed at an inner side of the output shaft 60 to be mentioned later. The output shaft 60 is rotatably supported by the metal bearing 18 having a cylindrical shape made of metal inside the front housing 11. That is, the other end part 49 of the motor shaft 45 is rotatably supported by the front housing 11 through the metal bearing 18 disposed in the front housing 11, the output shaft 60, and the front bearing 16. The one end part 46 of the motor shaft 45 is rotatably supported by the rear housing 13 through the rear bearing 17 disposed at the center of the bottom of the rear housing 13. Thus, the respective ends of the motor shaft 45 are rotatably supported by the front housing 11 and the rear housing 13.

The stator 30 is fixed to the rear housing 13 not to be rotatable by being press-fitted in a metal plate 8 which is formed in an approximately ring shape and insert-molded to the rear housing 13. That is, the stator 30 is fixed inside the rear housing 13 in the space 5.

The stator 30 is formed by plural thin boards made of magnetic material such as iron arranged in the thickness direction of the boards. The stator 30 has a stator core 31 and stator teeth 32. The stator core 31 is formed in an annular shape. The stator teeth 32 are formed to project from the stator core 31 inward in the radial direction. The stator teeth 32 are arranged in the circumferential direction of the stator core 31 at equal interval. In this embodiment, twelve stator teeth 32 are formed (refer to FIG. 11).

The coil 33 is formed cylindrical by coiling, for example, copper wire around a bobbin made of resin, and is inserted in each of the stator teeth 32. The coil 33 is electrically connected to a bus bar part 70. As shown in FIG. 1, the bus bar part 70 is formed in the bottom of the rear housing 13. Electric power to be supplied to the coil 33 flows into the bus bar part 70. The bus bar part 70 has a terminal 71 connected with the coil 33, at the radially inner side of the coil 33, in the stator 30. The coil 33 is electrically connected with the terminal 71. Electric power is supplied to the terminal 71 based on a drive signal outputted from ECU 2.

The rotor 40 is disposed at the inner side of the stator 30 in the radial direction. The rotor 40 is formed by plural thin boards made of magnetic material such as iron arranged in the thickness direction of the boards. The rotor 40 has a rotor core 41 and poles 42. The rotor core 41 is formed in a ring shape, and is press-fitted and fixed at the large diameter part 47 of the motor shaft 45. The poles 42 are formed to project from the rotor core 41 towards the stator 30 at the radially outer side. The poles 42 are arranged in the circumferential direction of the rotor core 41 at equal interval. In this embodiment, eight poles 42 are formed. The rotor 40 is rotatable relative to the stator 30 with the motor shaft 45 inside of the stator 30, since the rotor core 41 is press-fitted and fixed on the motor shaft 45.

When electric power is supplied to the coil 33, magnetic force is generated in the stator teeth 32 at the inner side of the coil 33. Thereby, the corresponding pole 42 of the rotor 40 is drawn to the stator teeth 32. The coils 33 correspond to three phases such as U phase, V phase, and W phase, for example. When the energizing is switched by ECU 2 in order of U phase, V phase, and W phase, the rotor 40 rotates to one side in the circumferential direction. When the energizing is conversely changed in order of W phase, V phase, and U phase, the rotor 40 rotates to the other side in the circumferential direction. Thus, the rotor 40 can be rotated in a set direction by controlling the magnetic force produced in the stator teeth 32 by switching the energizing to each of the coils 33. In this embodiment, a rotary encoder 72 is disposed between the bottom of the rear housing 13 and the rotor core 41. The rotary encoder 72 has a magnet 73, a substrate 74, and a Hall IC 75.

The magnet 73 is a multi-pole magnet formed annularly and magnetized alternately between N pole and S pole in the circumferential direction. The magnet 73 is arranged at an end of the rotor core 41 adjacent to the rear housing 13, and has the same axis as the rotor core 41. The substrate 74 is fixed to the inner wall of the bottom of the rear housing 13. The Hall IC 75 is mounted on the substrate 74 to oppose the magnet 73.

The Hall IC 75 has a Hall device and a signal transformation circuit. The Hall device is a magneto-electric conversion element using the Hall effect, and outputs an electric signal proportional to the density of the magnetic flux generated by the magnet 73. The signal transformation circuit changes the output signal of the Hall device into a digital signal. The Hall IC 75 outputs a pulse signal in sync with rotation of the rotor core 41 to ECU 2 via the signal pin 76. ECU 2 can detect the rotation angle and the rotational direction of the rotor core 41 based on the pulse signal from the Hall IC 75. The reduction gear 50 has a ring gear 51, a sun gear 52, and the output shaft 60.

The ring gear 51 is formed in a ring shape, and is made of metal such as iron. The ring gear 51 is press-fitted in the annular metal plate 9 which is insert-molded to the middle housing 12. An outer edge part of the ring gear 51 has an ear part 511 extending outward in the radial direction. The ear part 511 is formed at six locations in the circumferential direction of the ring gear 51 at a regular interval. The ring gear 51 is disposed such that the ear part 511 fits in the groove portion 512 formed at the inner edge part of the plate 9 (refer to FIGS. 1 and 3). Thereby, the ring gear 51 is fixed not to be rotatable relative to the middle housing 12. The ring gear 51 is fixed to the middle housing 12 to have the same axis (axis Ax1) as the motor shaft 45. The ring gear 51 has inner teeth 53 formed at the inner edge part. The groove portion 512 is formed at six locations in the circumferential direction of the plate 9 at a regular interval.

The sun gear 52 is formed in an approximately disk shape, and is made of metal such as iron. The sun gear 52 has a cylindrical projection part 54 formed to project in the thickness direction from a position distanced from the center of one surface in the radial direction by a predetermined distance. The projection part 54 is formed at plural locations in the circumferential direction of the sun gear 52 at equal interval. In this embodiment, for example, nine projection parts 54 are formed (refer to FIG. 3). Moreover, an outer edge part of the sun gear 52 has outer teeth 55 meshing with the inner teeth 53 of the ring gear 51. The sun gear 52 is disposed eccentric, not to be rotatable, relative to the motor shaft 45 through a middle bearing 19 disposed at the perimeter of the eccentric part 48 of the motor shaft 45. Thereby, when the motor shaft 45 rotates, the sun gear 52 rotates about own axis and revolves at the inner side of the ring gear 51, while the outer teeth 55 mesh with the inner teeth 53 of the ring gear 51. The middle bearing 19 is, for example, a ball bearing similarly to the front bearing 16 and the rear bearing 17.

The output shaft 60 is formed, for example, with metal such as iron. The output shaft 60 has an output pipe part 61 having an approximately cylindrical shape and a disk part 62 having an approximately disk shape. The output pipe part 61 is rotatably supported by the front housing 11 through the metal bearing 18 disposed at the inner side of the front housing 11. The output pipe part 61 is formed to have the same axis as the large diameter part 47 of the motor shaft 45. The front bearing 16 is formed inside the output pipe part 61. Thereby, the output pipe part 61 supports the other end part 49 of the motor shaft 45 rotatably through the metal bearing 18 and the front bearing 16.

In the space 5, the disk part 62 is formed in an approximately disk shape to spread outward in the radial direction from the end of the output pipe part 61 adjacent to the sun gear 52. The disk part 62 has a hole part 63, and the projection part 54 of the sun gear 52 is able to enter the hole part 63. The hole part 63 is formed to pass through the disk part 62 in the thickness direction. In this embodiment, the hole part 63 corresponds to the projection part 54, and is formed at nine locations in the circumferential directions of the disk part 62 (refer to FIG. 3). An outer edge part of the disk part 62 has outer teeth 64 entirely in circumferential direction (refer to FIG. 3).

When the sun gear 52 rotates about own axis and revolves at the inner side of the ring gear 51, the inner wall of the hole part 63 of the disk part 62 of the output shaft 60 is pushed by the outer wall of the projection part 54 in the circumferential direction of the disk part 62. Thereby, the rotation of the sun gear 52 about own axis is transmitted to the output shaft 60. The speed of the rotation of the sun gear 52 about own axis is slow compared with the revolving speed of the motor shaft 45. Therefore, the rotation output of the motor 3 is slowed down and outputted from the output shaft 60. Thus, the ring gear 51, the sun gear 52, and the output shaft 60 function as a gear mechanism.

Figure 3:
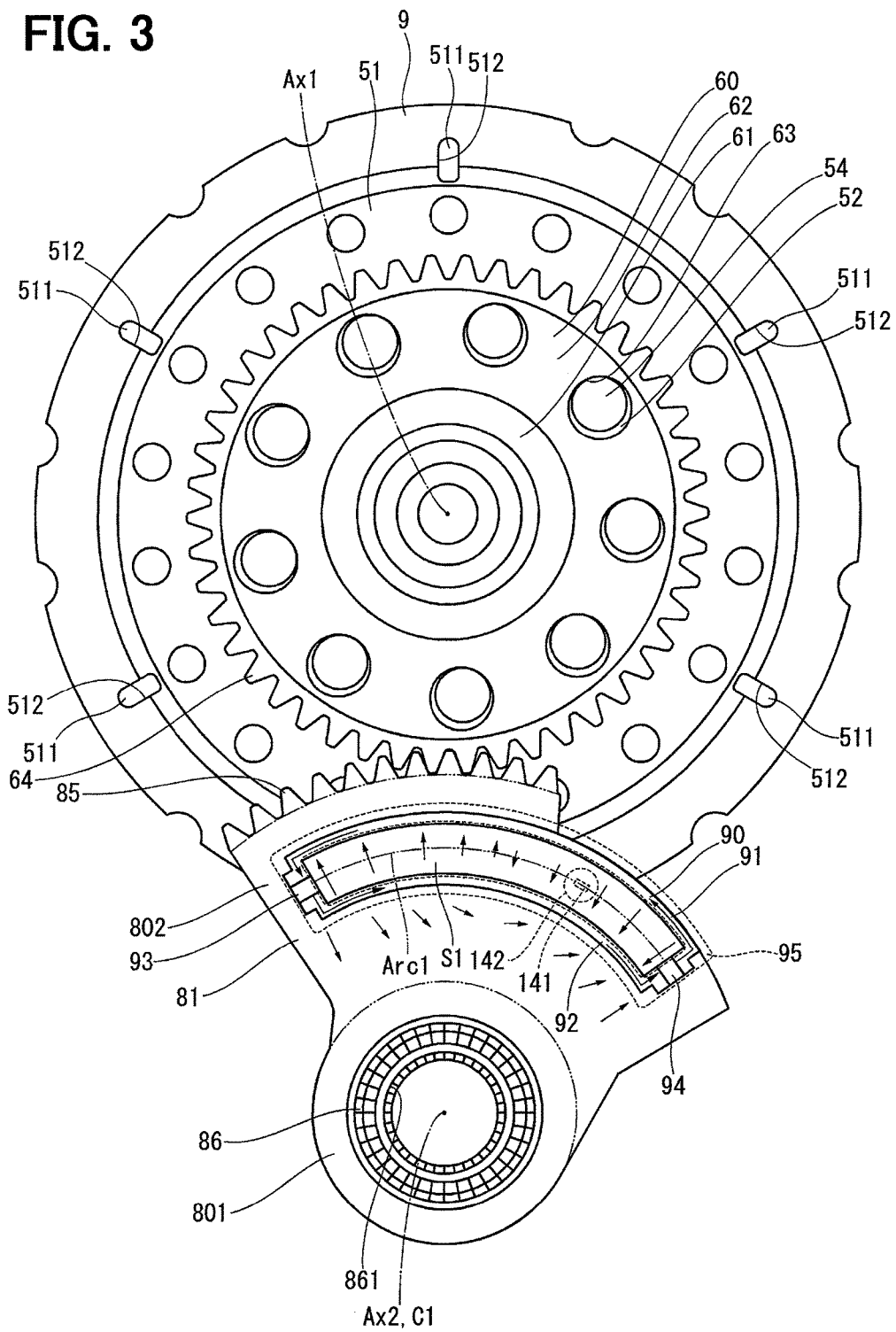
FIG. 3 is a side view illustrating a part of the rotation drive device of the first embodiment seen in an arrow direction III of FIG. 1.

The output gear 81 is formed, for example, with magnetic material such as iron with comparatively high strength. The output gear 81 is formed tabular. As shown in FIG. 3, the output gear 81 has an annular part 801, a sector part 802, and outer teeth 85.

The annular part 801 is formed in a ring shape. The sector part 802 is formed to spread from the outer edge part of the annular part 801 outward in the radial direction. In FIG. 3, a double chain line represents a boundary between the annular part 801 and the sector part 802.

The outer teeth 85 is formed in a part of the outer edge part of the sector part 802 in the circumferential direction. The output gear 81 is formed between the middle housing 12 and the sensor housing 14 so that the outer teeth 85 mesh with the teeth 64 of the output shaft 60. Thereby, when the motor 3 is driven to rotate and when the output shaft 60 rotates, the output gear 81 rotates about the axis of the annular part 801. That is, the output gear 81 rotates by the torque outputted from the motor shaft 45 of the motor 3. The axis of the annular part 801 is the rotation center C1 of the output gear 81.

The output unit 86 is, for example, formed in the shape of an approximately cylinder and is made of metal such as iron with comparatively high strength. An outer wall of an end of the output unit 86 is formed integrally with the output gear 81 to be connected with the inner wall of the annular part 801 of the output gear 81. Therefore, when the output gear 81 rotates, the output unit 86 rotates with the output gear 81 about the rotation center C1.

The output unit 86 is formed so that the end opposite from the output gear 81 is located inside the cylindrical metal bearing 87 disposed in the middle housing 12. Thereby, the output unit 86 and the output gear 81 are rotatably supported by the middle housing 12 through the metal bearing 87. A spline slot 861, as a terminal area, is formed in the inner wall of the end of the output unit 86 opposite from the output gear 81.

As shown in FIG. 1, the output unit 86 and the manual shaft 101 are spline-combined, in other words, one end of the manual shaft 101 of the shift-by-wire system 100 is fitted to the spline slot 861 of the output unit 86. Thereby, the output unit 86 outputs the torque of the motor shaft 45 of the motor 3 to the manual shaft 101, as the rotation of the motor shaft 45 is transmitted via the reduction gear 50 and the output gear 81.

As shown in FIG. 3, the yoke 90 has a first yoke 91 and a second yoke 92. Each of the first yoke 91 and the second yoke 92 is circularly formed by circular thin boards made of magnetic material such as iron. The first yoke 91 and the second yoke 92 are formed between the sensor housing 14 and the output gear 81. The first yoke 91 is formed to extend along the outer edge part of the sector part 802 of the output gear 81 in which the outer teeth 85 is not formed. The second yoke 92 is formed at a position distant from the first yoke 91 by a predetermined distance, adjacent to the rotation center C1 of the output gear 81 relative to the first yoke 91.

The first yoke 91 and the second yoke 92 are formed along an arc Arc1 having a center corresponding to the rotation center C1 of the output gear 81. Thereby, an arc clearance S1 which is an arc-shaped clearance along the arc Arc1 having a center corresponding to the rotation center C1 is formed between the first yoke 91 and the second yoke 92.

The magnet 93 as a first magnetic flux generating part is interposed between the end of the first yoke 91 and the end of the second yoke 92. An S-pole side of the magnet 93 is in contact with the end of the first yoke 91, and the N-pole side is in contact with the end of the second yoke 92.

The magnet 94 as a second magnetic flux generating part is interposed between the other end of the first yoke 91 and the other end of the second yoke 92. The magnet 94 is formed so that the N pole side is in contact with the other end of the first yoke 91 and the S pole side is in contact with the other end of the second yoke 92.

Thereby, the magnetic flux generated from the N pole of the magnets 93 and 94 flows into the first yoke 91 and the second yoke 92. Moreover, the magnetic flux which flows through the first yoke 91 and the second yoke 92 flows as a leak magnetic flux in the arc clearance S1 between the first yoke 91 and the second yoke 92. Moreover, the magnetic flux generated from the N pole of the magnets 93 and 94 flows also into the output gear 81 made of magnetic material.

In this embodiment, the first yoke 91, the second yoke 92, and the magnets 93 and 94 are covered with a mold part 95 made of resin. That is, the first yoke 91, the second yoke 92, and the magnets 93 and 94 are molded with resin.

The Hall IC 141 as a magnetic flux density detector is insert-molded to a support part 142 projected from the sensor housing 14 toward the output gear 81. That is, the Hall IC 141 is located adjacent to the front housing 11. The support part 142 supports the Hall IC 141. As shown in FIG. 3, the support part 142 and the Hall IC 141 are located in the arc clearance S1. That is, the Hall IC 141 is disposed in the sensor housing 14 to be movable relative to the yoke 90 in the arc clearance S1.

The Hall IC 141 has a Hall device and a signal transformation circuit similarly to the Hall IC 75. The Hall device outputs a signal according to the density of the leak magnetic flux which flows in the arc clearance S1. That is, the Hall device outputs the signal according to the density of the passing magnetic flux.

The output gear 81 and the output unit 86 are rotatable within a range of the length of the outer teeth 85 in the circumferential direction. That is, the rotatable range of the output gear 81 and the output unit 86 corresponds to the range of the length of the outer teeth 85 in the circumferential direction. The Hall IC 141 and the support part 142 are movable relative to the yoke 90 from adjacency of the end of the arc clearance S1 adjacent to the magnet 93 to adjacency of the end of the arc clearance S1 adjacent to the magnet 94.

The Hall IC 141 outputs the signal according to the rotation position of the yoke 90 to ECU 2. ECU 2 can detect the rotation position of the output gear 81 and the output unit 86 based on the signal from the Hall IC 141. Thereby, ECU 2 can detect the rotation position of the manual shaft 101, and the shift range of the automatic shift 108.

FIG. 3 illustrates the magnetic flux generated from the N pole of the magnets 93 and 94, and flows through the yoke 90 and the output gear 81, and the leak magnetic flux flowing in the arc clearance S1. The direction of the arrow indicating the magnetic flux corresponds to the direction of the magnetic flux, and the length of the arrow line corresponds to the magnitude of the magnetic flux density.

Figure 4:
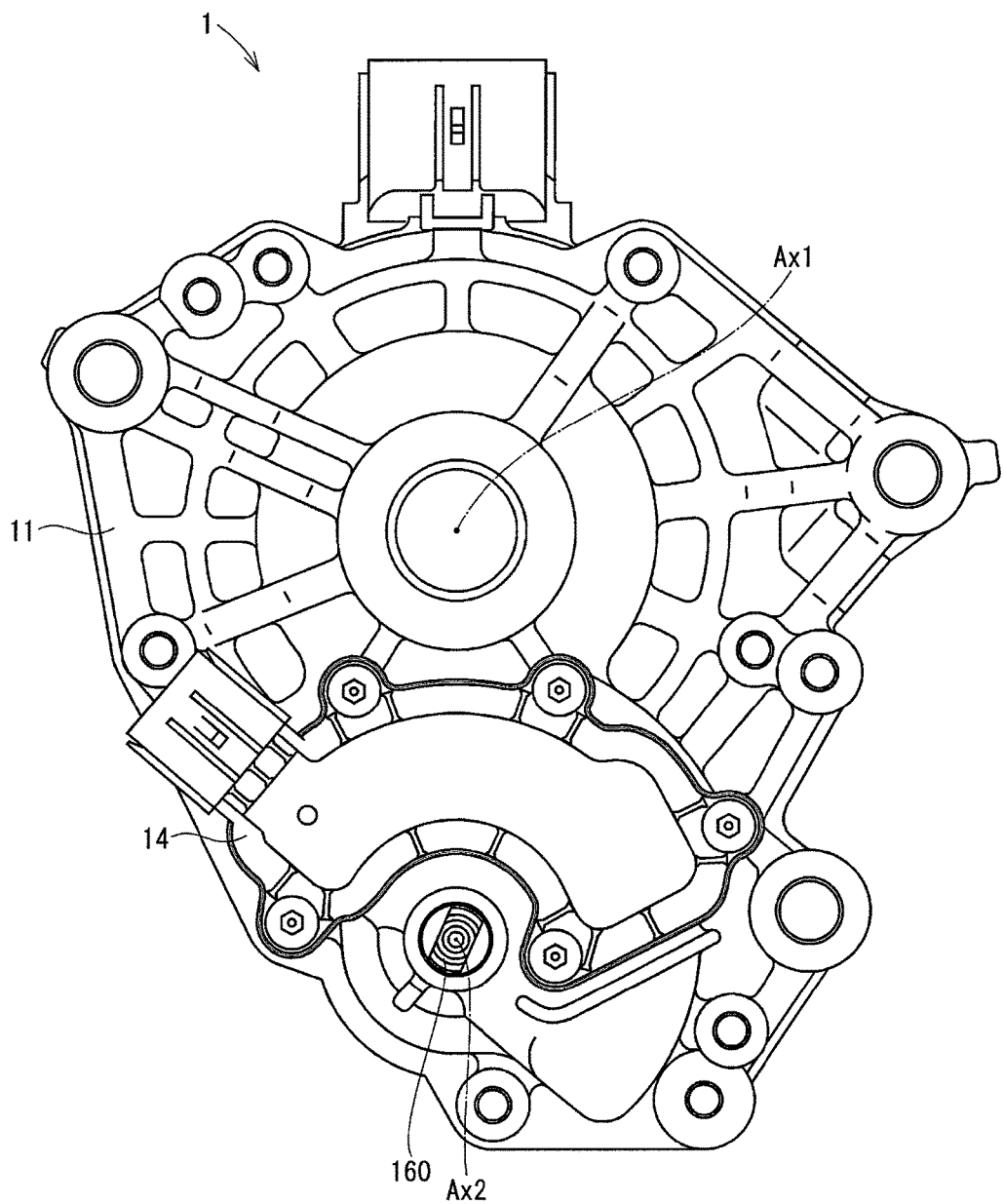
FIG. 4 is a view seen from an arrow direction IV in FIG. 1.

As shown in FIG. 3, the density of the leak magnetic flux which flows in the arc clearance S1 is higher at a position nearer to the magnet 93 or the magnet 94, and is lower at a position nearer to the center of the arc clearance S1. Moreover, the direction of the leak magnetic flux which flows in the arc clearance S1 reverses between the magnet 93 side and the magnet 94 side bordering at the center of the arc clearance S1. Therefore, the magnetic flux density is zero at the center of the arc clearance S1. In this embodiment, a compulsive drive shaft 160 is further provided (refer to FIGS. 1 and 4).

The compulsive drive shaft 160 is formed in a long-length shape, for example, made of metal, and is prepared at a side opposite from the spline slot 861 on the axis line (Ax2) of the output unit 86. In this embodiment, the compulsive drive shaft 160 is formed coaxially with the output unit 86.

The compulsive drive shaft 160 can rotate the output unit 86 compulsorily, if torque is inputted. In this embodiment, when the output unit 86 rotates compulsorily by the compulsive drive shaft 160, the manual shaft 101 rotates in a direction to cancel the engagement between the protrusion part 125 of the park pole 123 and the parking gear 126, namely, such that the stopper 107 moves to the concave portion 154 (D range) from the concave portion 151 (P range). For example, in case where the rotary actuator 1 becomes not operable when the shift range is a P range, the P range (lock of driving wheel) can be canceled by manually rotating the compulsive drive shaft 160.

Figure 5:
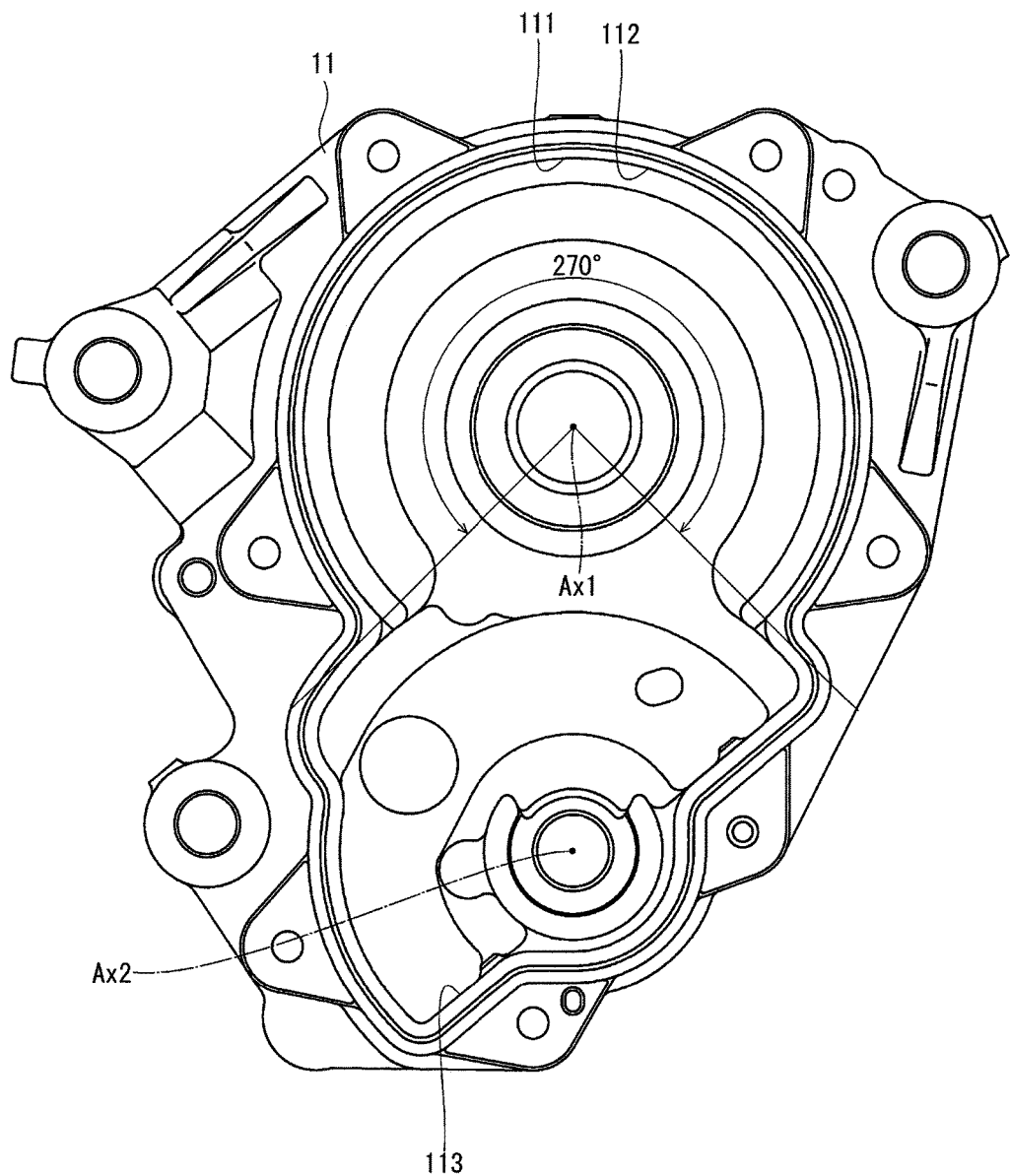
FIG. 5 is a view illustrating a front housing of the rotation drive device of the first embodiment seen from a middle housing side.

Next, the housing 10 of this embodiment is explained in detail. As shown in FIG. 5, the front housing 11 has the inner wall 111 formed cylindrical at a side adjacent to the middle housing 12. The inner wall 111 has a cylinder wall 112 and a non-cylinder wall 113. The cylinder wall 112 has an arc shape formed along a virtual cylinder surface having an axis corresponding to the axis Ax1 of the motor shaft 45. The arc shape of the cylinder wall 112 has an angle of about 270 degrees about the axis Ax1, and is located at the radially outer side of the reduction gear 50 and the output shaft 60 (refer to FIGS. 1 and 5). That is, the cylinder wall 112 is formed to be located in a predetermined range in the circumferential direction, at the radially outer side of the reduction gear 50 corresponding to a gear mechanism, and the output shaft 60. The non-cylinder wall 113 is formed in which both ends are connected with the respective ends of the cylinder wall 112, and is located at the radially outer side of the output gear 81 (refer to FIGS. 1 and 5).

Figure 6:
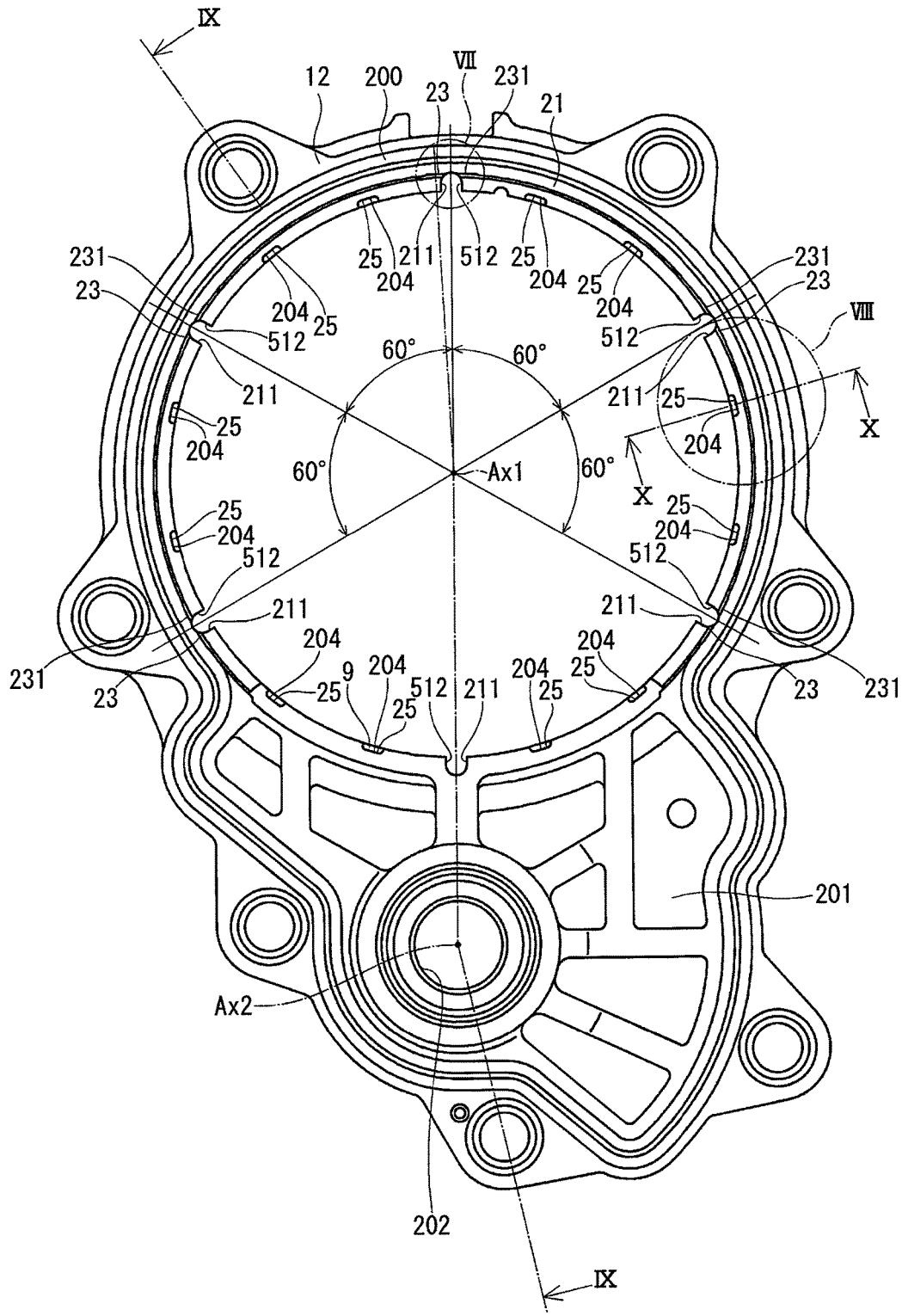
FIG. 6 is a view illustrating the middle housing of the rotation drive device of the first embodiment seen from a front housing side.
Figure 9:
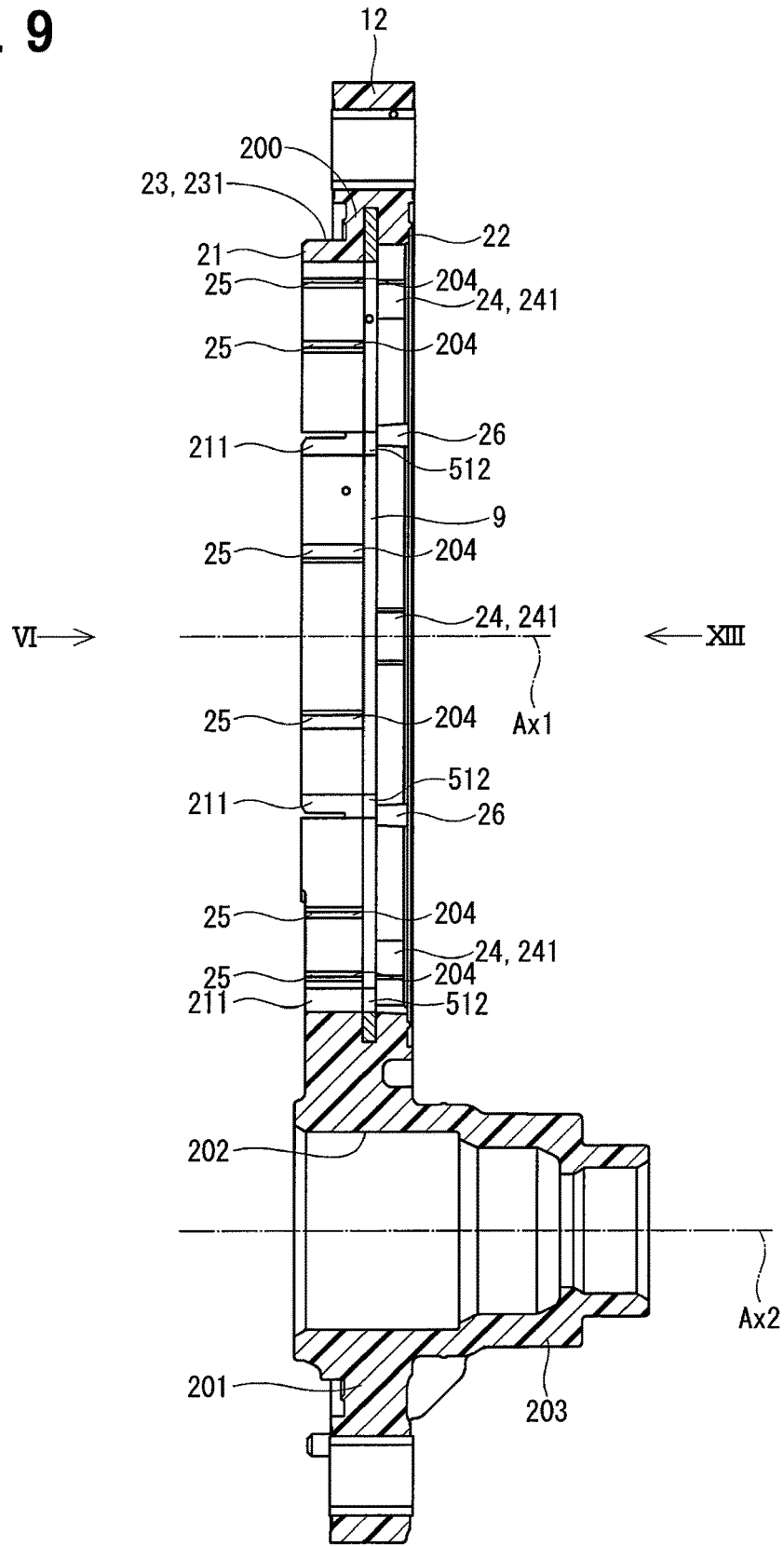
FIG. 9 is a cross-sectional view taken along a line IX-IX of FIG. 6.
Figure 10:
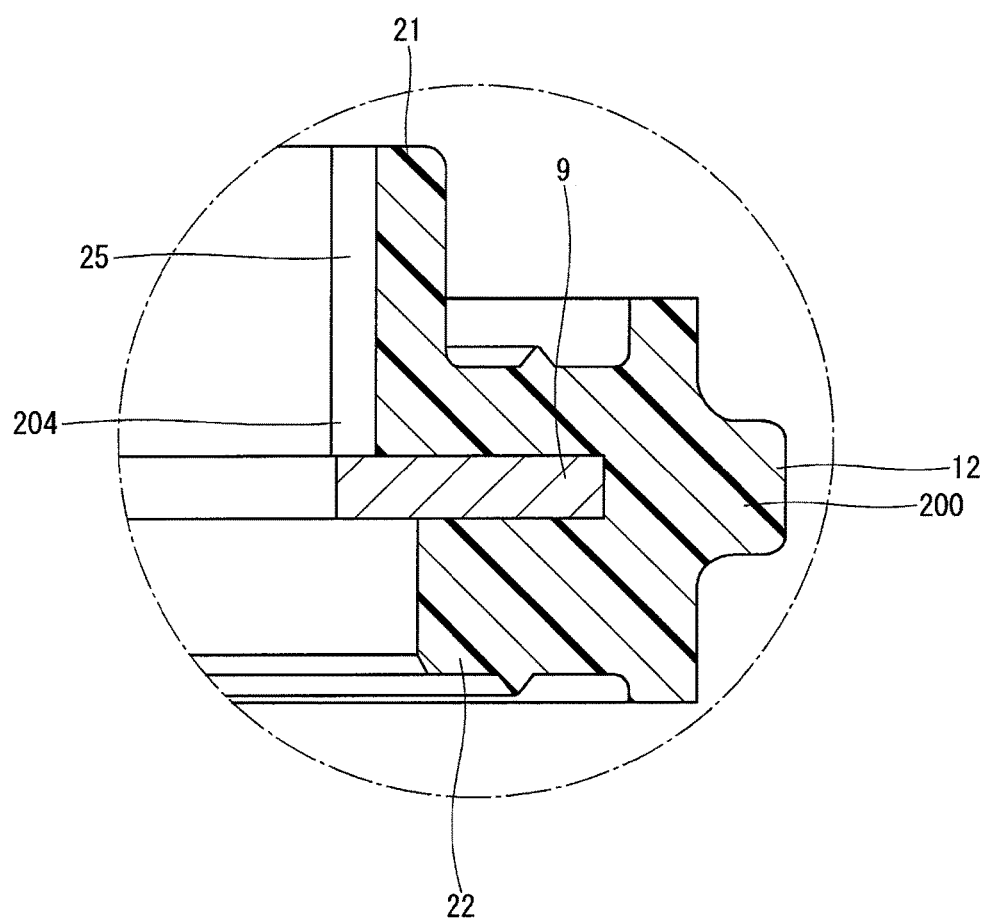
FIG. 10 is a cross-sectional view taken along a line X-X of FIG. 6.
Figure 13:
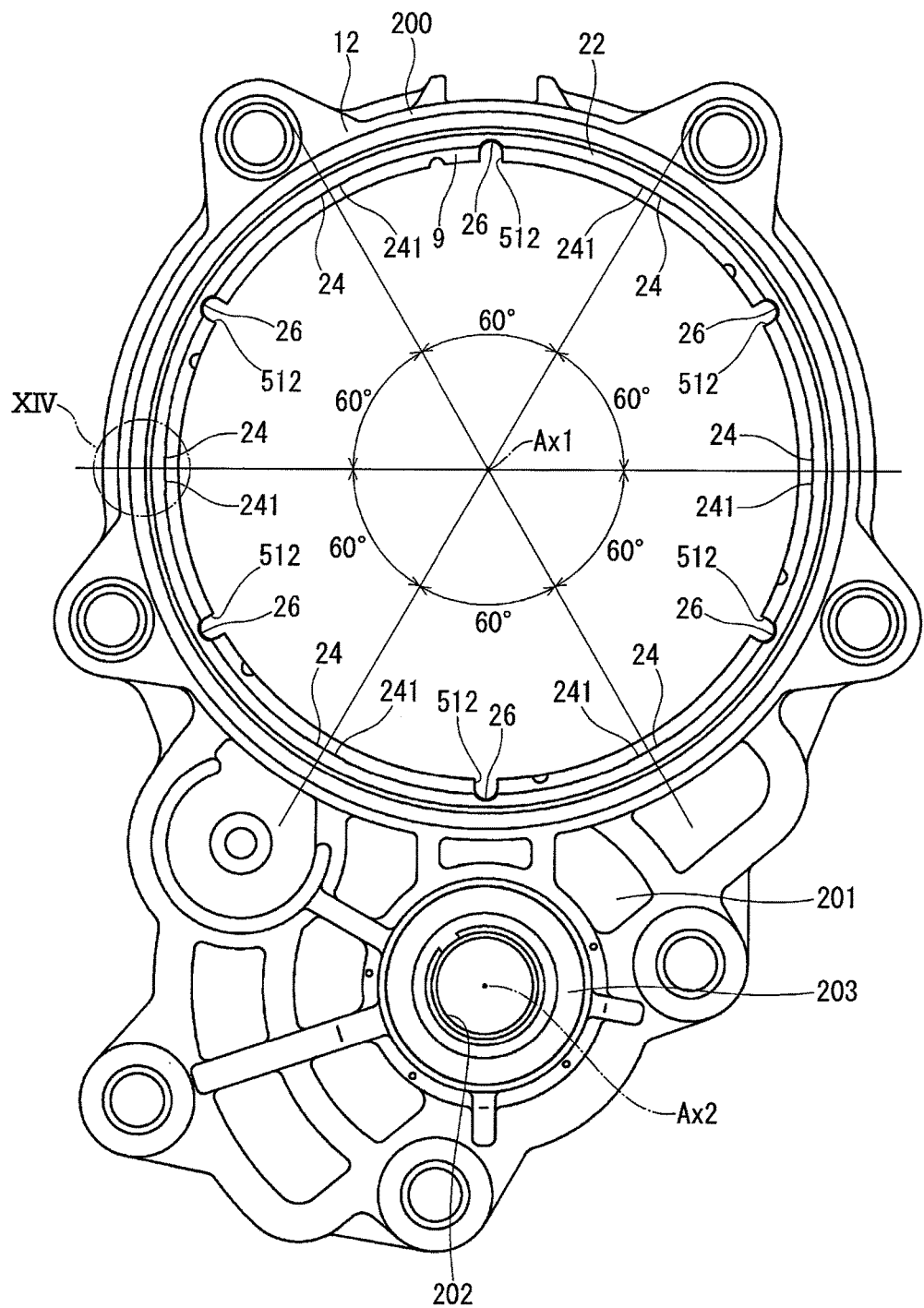
FIG. 13 is a view seen from an arrow direction XIII in FIG. 9.

As shown in FIGS. 6, 9, and 13, the middle housing 12 has the annular part 200, the tabular part 201, the hole part 202, and the cylindrical part 203. The annular part 200 is formed in an approximately ring shape, and is located at the radially outer side of the ring gear 51. The plate 9 is insert-molded to the annular part 200 so that the inner edge part and the groove portion 512 are exposed to the inside of the annular part 200 (refer to FIG. 9). The tabular part 201 is formed in a board shape corresponding to the shape of the output gear 81, and is formed integrally with the annular part 200 such that the outer edge part is connected with the outer edge part of the annular part 200. The hole part 202 is formed to pass through the tabular part 201 in the thickness direction. The cylindrical part 203 is formed in a cylindrical shape to extend from the hole part 202 to a side opposite from the front housing 11. The output unit 86 is formed inside the hole part 202 and the cylindrical part 203. The middle housing 12 further has a front side extension part 21, a rear side extension part 22, a front side convex part 23, a rear side convex part 24, a front side concave portion 25, and a rear side concave portion 26.

The front side extension part 21 is formed integrally with the annular part 200 and has a cylindrical shape extending from the annular part 200 toward the front housing 11. The front side extension part 21 is formed in an approximately cylinder shape along the virtual cylinder surface about the axis Ax1 of the motor shaft 45. The front side extension part 21 is located at the radially outer side of the reduction gear 50 (refer to FIGS. 1, 6 and 9).

The front side extension part 21 has an outer diameter smaller than the inside diameter of the cylinder wall 112 of the front housing 11. An outer circumference wall of the front side extension part 21 opposes the cylinder wall 112 of the front housing 11, and an approximately cylindrical clearance can be formed between the cylinder wall 112 and the front side extension part 21.

The front side extension part 21 has a division part 211 at a position corresponding to the groove portion 512 of the plate 9. The division part 211 extends in the radial direction outward from the inner circumference wall of the front side extension part 21, and the plural division parts 211 are formed to divide the front side extension part 21. Thereby, the front side extension part 21 is divided into plural parts in the circumferential direction by the division part 211 (refer to FIGS. 6 and 9). The division part 211 is formed at six locations in the circumferential direction of the front side extension part 21 at interval of about 60 degrees. Therefore, the front side extension part 21 is divided into six parts in the circumferential direction.

The rear side extension part 22 is formed integrally with the annular part 200 to extend in a cylindrical shape from the annular part 200 toward the rear housing 13. The rear side extension part 22 is formed in an approximately cylinder shape along the virtual cylinder surface about the axis Ax1 of the motor shaft 45. The rear side extension part 22 is located at the radially outer side of the stator 30 (refer to FIGS. 1, 9 and 13).

An inside diameter of the rear side extension part 22 is set larger than the outer diameter of the stator core 31 of the stator 30. The inner circumference wall of the rear side extension part 22 opposes the outer circumference wall of the stator core 31, such that an approximately cylindrical clearance can be formed between the outer circumference wall of the stator core 31 and the rear side extension part 22. The front side convex part 23 is formed to project outward in the radial direction from the outer circumference wall of the front side extension part 21. The front side convex part 23 is formed to be in contact with the cylinder wall 112 of the front housing 11.

The front side convex part 23 is formed on the front side extension part 21 at the position corresponding to the five groove portions 512 of the plate 9. That is, the front side convex part 23 is formed at five locations with interval of about 60 degrees in the circumferential direction of the front side extension part 21 (refer to FIG. 6).

Figure 7:
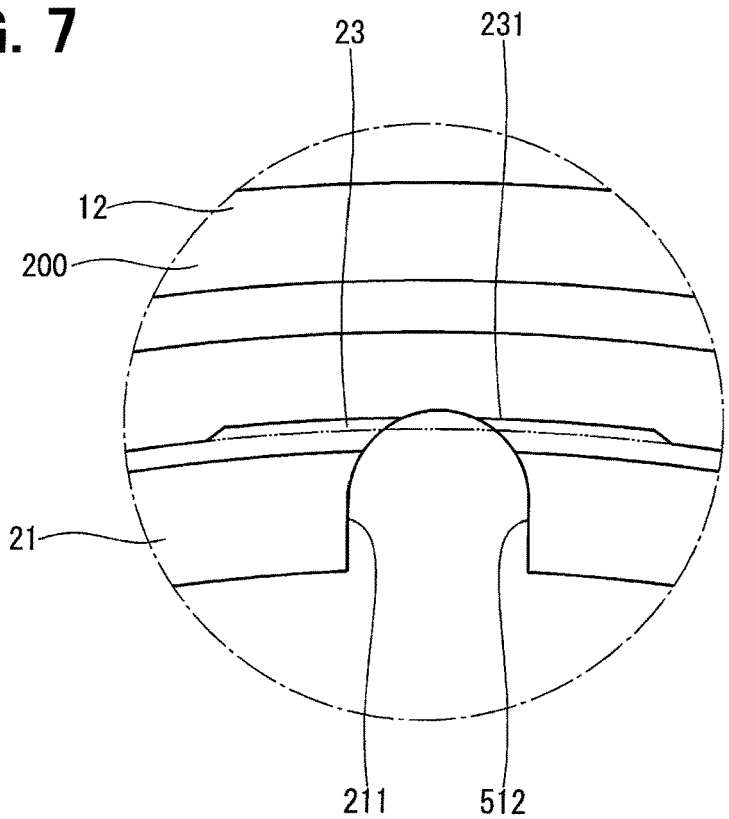
FIG. 7 is an enlarged view of a portion VII of FIG. 6.

The front side convex part 23 has an opposing surface 231 opposing the cylinder wall 112 of the front housing 11 (refer to FIG. 7). The opposing surface 231 is formed in a curved surface shape which is in agreement with a part of the virtual cylinder surface, and a curvature radius of the opposing surface 231 is smaller than the curvature radius of the cylinder wall 112. Therefore, a part of the opposing surface 231 of the front side convex part 23 is able to be in contact with the cylinder wall 112. In this embodiment, at least one of the five front side convex parts 23 is in contact with the cylinder wall 112. Each of the five front side convex parts 23 is divided at the center (refer to FIGS. 6 and 7). That is, each of the five front side convex parts 23 is divided into two parts in the circumferential direction of the front side extension part 21.

Figure 11:
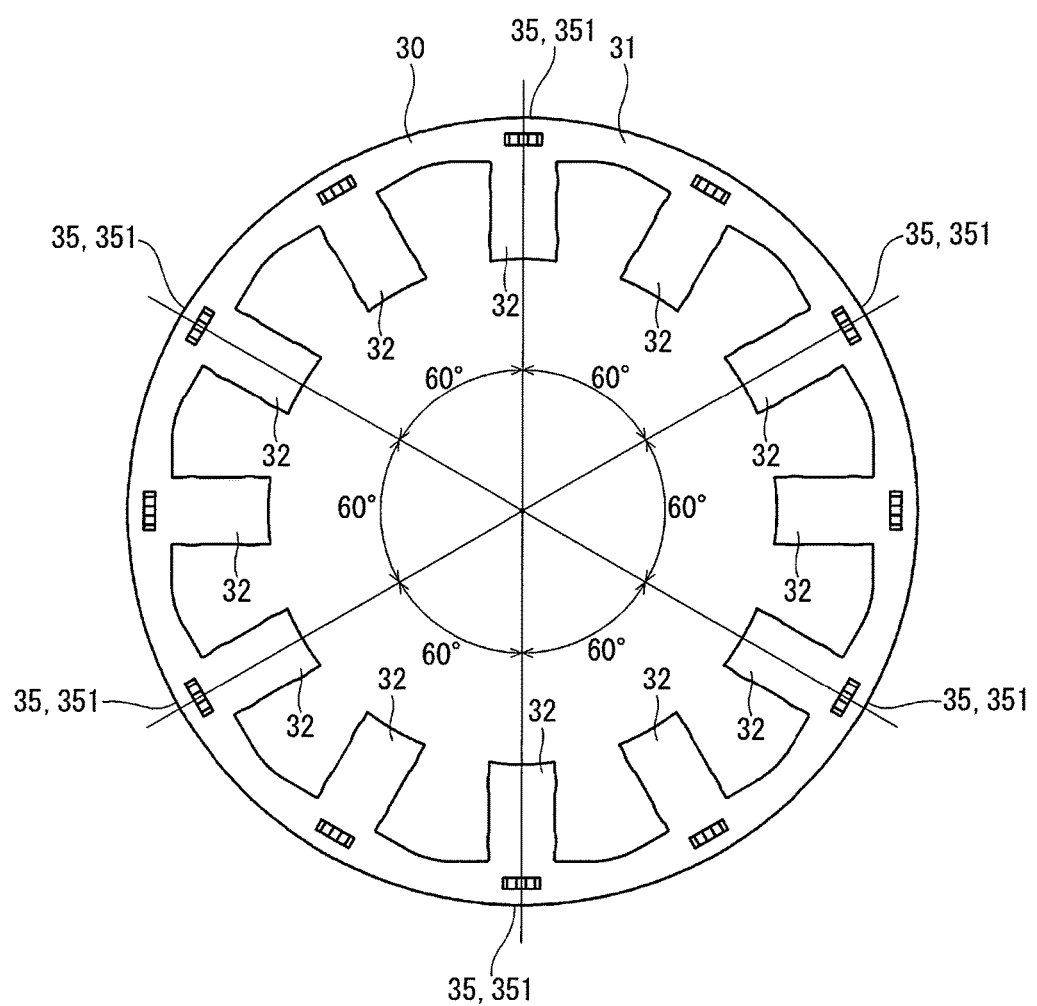
FIG. 11 is a plan view illustrating a stator of the rotation drive device of the first embodiment.

As shown in FIG. 11, the stator 30 further has a stator convex part 35. The stator convex part 35 is formed integrally with the stator core 31 to project outward in the radial direction from the outer circumference wall of the stator core 31. The stator convex part 35 is formed at six locations in the circumferential direction with regular interval at the opposite side of the stator core 31 opposite from the stator teeth 32. That is, the stator convex part 35 is formed at six locations in the circumferential direction of the stator core 31 at interval of about 60 degrees (refer to FIG. 11).

Figure 12:
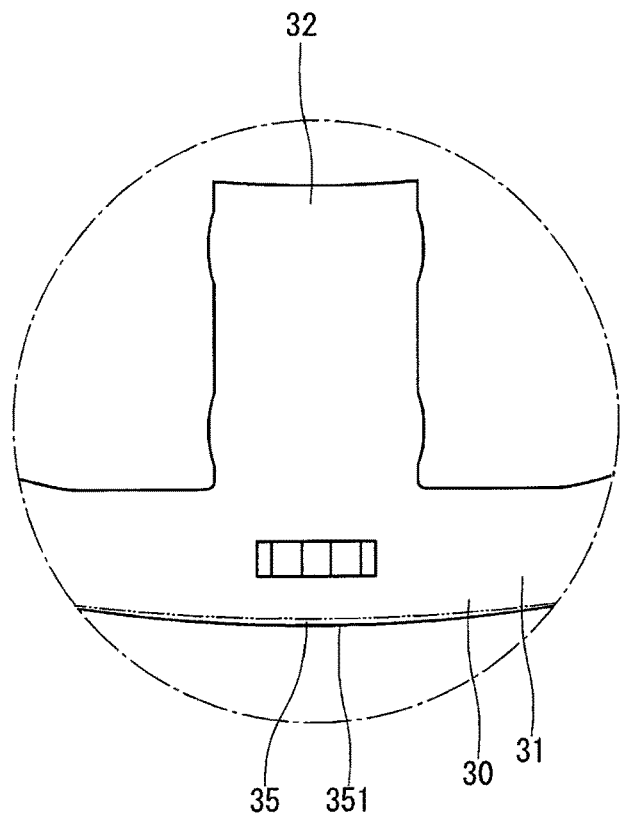
FIG. 12 is an enlarged view illustrating a tooth of the stator of FIG. 11.

The stator convex part 35 has a curved surface 351 at a side opposite from the stator teeth 32 (refer to FIG. 12). The curved surface 351 is formed in a curved surface shape in agreement with a part of the virtual cylinder surface, and the curvature radius of the curved surface 351 is smaller than the curvature radius of the outer circumference wall of the stator core 31. Therefore, the stator convex part 35 and the curved surface 351 are located at the radially outer side of the outer circumference wall of the stator core 31.

The rear side convex part 24 is formed to project from the inner circumference wall of the rear side extension part 22 inward in the radial direction. The rear side convex part 24 is formed to be in contact with the outer edge part of the stator 30, more specifically, to be in contact with the curved surface 351 of the stator convex part 35.

The rear side convex part 24 is formed at a position corresponding to the stator convex part 35, on the rear side extension part 22, which is an intermediate position between the positions corresponding to the groove portion 512 of the plate 9. That is, the rear side convex part 24 is formed at six locations in the circumferential direction of the rear side extension part 22 with interval of about 60 degrees (refer to FIG. 13).

Figure 14:
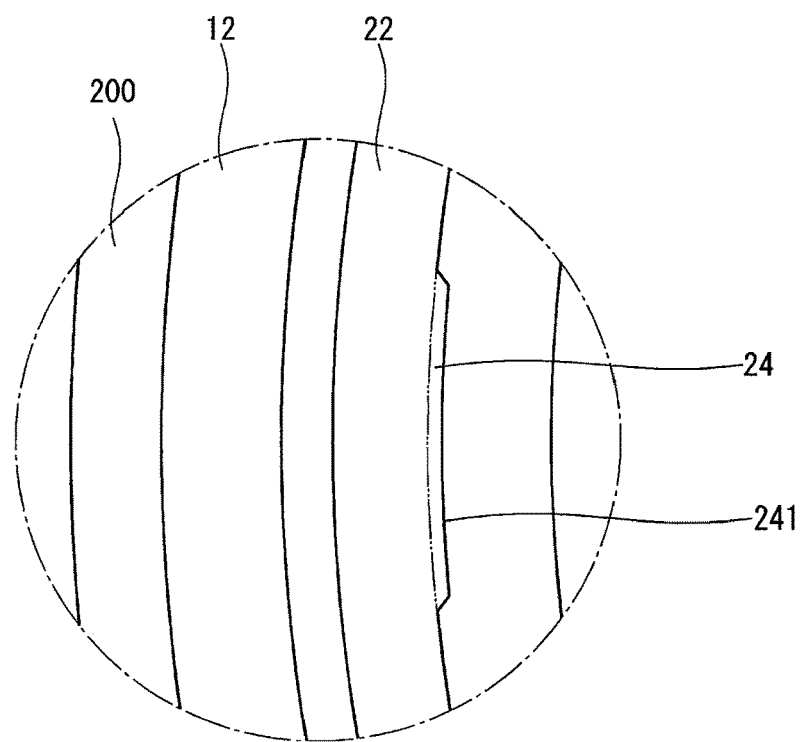
FIG. 14 is an enlarged view of a portion XIV of FIG. 13.

The rear side convex part 24 has an opposing surface 241 opposing the curved surface 351 of the stator convex part 35 (refer to FIG. 14). The opposing surface 241 is formed in a curved surface shape in agreement with a part of the virtual cylinder surface, and a curvature radius of the opposing surface 241 is larger than the curvature radius of the curved surface 351. Therefore, a part of the opposing surface 241 of the rear side convex part 24 is able to be in contact with a part of the curved surface 351. In this embodiment, at least one of the six rear side convex parts 24 is in contact with the curved surface 351.

Figure 8:
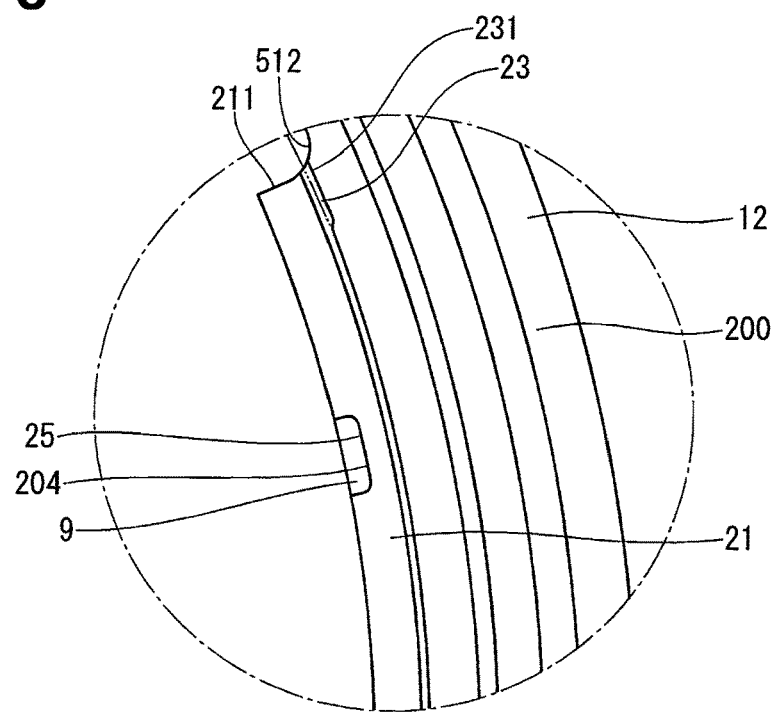
FIG. 8 is an enlarged view of a portion VIII of FIG. 6.

As shown in FIGS. 6 and 8, the front side concave portion 25 is formed to be recessed outward in the radial direction from the inner circumference wall of the front side extension part 21. Two front side concave portions 25 are formed between the division parts 211 in the circumferential direction of the front side extension part 21. That is, the total number of the front side concave portions 25 is twelve. The annular part 200 has the concave portion 204. The concave portion 204 is formed to be recessed in the radial direction outward from the inner circumference wall of the annular part 200. Two concave portions 204 are formed between the positions corresponding to the groove portion 512 of the plate 9 in the circumferential direction of the annular part 200. That is, the total number of the concave portions 204 is twelve. The end surface of the plate 9 adjacent to the front housing 11 is exposed to the concave portion 204. Moreover, each of the twelve concave portions 204 is connected to the front side concave portion 25.

As shown in FIG. 13, the rear side concave portion 26 is formed to be recessed in the radial direction outward from the inner circumference wall of the rear side extension part 22. The rear side extension part 22 is formed at the position corresponding to the groove portion 512 of the plate 9. The rear side concave portion 26 is formed at six locations in the circumferential direction of the rear side extension part 22 at regular interval. That is, the rear side concave portion 26 is formed at six locations in the circumferential direction of the rear side extension part 22 at interval of about 60 degrees.

Next, the production method of the rotary actuator 1 of this embodiment is explained. The production method of the rotary actuator 1 includes the following processes.

(Plate Pressing Process)

The plate 9 is put on an installation stand (not shown), and the plate 9 is pressed down to the installation stand by a jig with twelve rods. The jig is arranged at the position corresponding to the concave portion 204 of the annular part 200 and the front side concave portion 25 of the front side extension part 21 to press down the plate 9.

(Middle Housing Forming Process)

After the plate pressing process, a metal die is chosen and adjusted to form the middle housing 12 by injection molding, in consideration of an axial misalignment direction and amount between the front side convex part 23 and the cylinder wall 112 after assembling the middle housing 12 and the front housing 11, and in consideration of an axial misalignment direction and amount between the rear side convex part 24 and the stator convex part 35 after assembling the middle housing 12 and the stator 30. A die with an insert may be used for forming the front side convex part 23 and the rear side convex part 24. In this case, the projection amount of the front side convex part 23 and the rear side convex part 24 can be adjusted by exchanging the die with an insert. The concave portion 204 and the front side concave portion 25 are formed at the position corresponding to the jig with twelve rods, in the middle housing 12 formed through the above-described processes.

According to the present embodiment, the rotary actuator 1 includes the front housing 11, the middle housing 12, the rear housing 13, the motor shaft 45, the stator 30, the rotor 40, the reduction gear 50 and the output shaft 60 corresponding to a gear mechanism, and the output unit 86. The middle housing 12 is formed at the opening of the front housing 11. The middle housing 12 is disposed between the front housing 11 and the rear housing 13, and the space 5 is defined between the front housing 11 and the middle housing 12. The motor shaft 45 has ends supported by the front housing 11 and the rear housing 13 to be rotatable. The stator 30 is fixed inside the rear housing 13 in the space 5. The rotor 40 is disposed to be rotatable with the motor shaft 45 at the inner side of the stator 30. The reduction gear 50 and the output shaft 60 are located adjacent to the front housing 11, relative to the stator 30 and the rotor 40, in the space 5, and can transmit the torque of the motor shaft 45. The output unit 86 is disposed to be rotatable at the radially outer side of the motor shaft 45, and is able to output the torque of the motor shaft 45 transmitted with the reduction gear 50 and the output shaft 60.

The middle housing 12 has the annular part 200, the front side extension part 21, the rear side extension part 22, the front side convex part 23, and the rear side convex part 24. The annular part 200 is formed at the radially outer side of the reduction gear 50. The front side extension part 21 extends in a cylindrical shape from the annular part 200 toward the front housing 11, and is located at the radially outer side of the reduction gear 50. The rear side extension part 22 extends in a cylindrical shape from the annular part 200 toward the rear housing 13, and is located at the radially outer side of the stator 30. The front side convex part 23 is projected from the outer circumference wall of the front side extension part 21 outward in the radial direction, and is formed to be in contact with the inner wall 111 of the front housing 11. The front side convex part 23 is one of a plurality of front side convex parts 23. The rear side convex part 24 is projected inward in the radial direction from the inner circumference wall of the rear side extension part 22, and is formed to be in contact with the outer edge part of the stator 30. The rear side convex part 24 is one of a plurality of rear side convex parts 24.

In this embodiment, the middle housing 12 has the front side convex part 23 projected in the radial direction outward from the outer circumference wall of the front side extension part 21, and the front side convex part 23 is able to be in contact with the inner wall 111 of the front housing 11.

Thereby, the relative position between the middle housing 12 and the front housing 11 is specified in a direction perpendicular to the axis. Moreover, the rear side convex part 24 of the middle housing 12 is projected from the inner circumference wall of the rear side extension part 22 inward in the radial direction, and is able to be in contact with the outer edge part of the stator 30. Thereby, the relative position between the middle housing 12 and the stator 30 is specified in the direction perpendicular to the axis. Moreover, the stator 30 is fixed to the rear housing 13. Therefore, the relative position between the front housing 11 and the rear housing 13 is specified in the direction perpendicular to the axis through the stator 30 and the middle housing 12. The front housing 11 and the rear housing 13 support the motor shaft 45 to be rotatable.

A coefficient of linear expansion differs among the middle housing 12, the front housing 11, and the stator 30. Therefore, when the rotary actuator 1 is used in a high temperature environment, stress arises among the middle housing 12, the front housing 11, and the stator 30, and an axial misalignment may occur among the motor shaft 45, the stator 30, and the reduction gear 50 and the output shaft 60. In this embodiment, as mentioned above, the plural front side convex parts 23 are able to be in contact with the inner wall 111 of the front housing 11, and the plural rear side convex parts 24 are able to be in contact with the outer edge part of the stator 30, in the middle housing 12. Therefore, the stress produced among the middle housing 12, the front housing 11, and the stator 30 can be reduced, compared with a conventional rotary actuator in which all of the outer circumference walls of the front side extension part is in contact with the inner wall of the front housing, and all of the inner circumference walls of the rear side extension part is in contact with the outer edge part of the stator. Thereby, the axial misalignment can be restricted from being generated among the motor shaft 45, the stator 30, and the reduction gear 50 and the output shaft 60. As a result, because increase in the friction loss among the rotation components at the operation time can be reduced, the torque outputted from the output unit 86 can be restricted from decreasing. Therefore, it is not necessary to enlarge the size of the stator 30 or to increase the current supplied to the rotary actuator 1 in consideration of the fall in the torque resulting from the axial misalignment among the rotation components. Therefore, the output torque can be increased, without enlarging the size of the rotary actuator 1 or increasing power consumption at the operation time.

Moreover, in the manufacturing process, the axial misalignment among the components can be reduced by choosing and adjusting the metal die in consideration of the axial misalignment direction and amount between the front side convex part 23 and the cylinder wall 112 after assembling the middle housing 12 and the front housing 11, and the axial misalignment direction and amount between the rear side convex part 24 and the stator convex part 35 after assembling the middle housing 12 and the stator 30.

According to the present embodiment, at least one of the front side convex parts 23 is divided in the circumferential direction of the front side extension part 21. Therefore, rigidity of the front side convex part 23 can be reduced, and the stress caused by the linear expansion difference between the middle housing 12 and the front housing 11 can be further reduced. Thereby, the axial misalignment which may be generated between the motor shaft 45, the stator 30, and the reduction gear 50 and the output shaft 60 can be further restricted.

According to the present embodiment, the middle housing 12 further has one or more front side concave portions 25 recessed from the inner circumference wall of the front side extension part 21 outward in the radial direction. Therefore, the rigidity of the front side extension part 21 can be suitably lowered, and the stress caused by the linear expansion difference between the middle housing 12 and the front housing 11 can be further reduced. Thereby, the axial misalignment which may be generated between the motor shaft 45, the stator 30, and the reduction gear 50 and the output shaft 60 can be further restricted.

According to the present embodiment, the middle housing 12 is made of resin, and the stator 30 and the front housing 11 are made of metal. Therefore, the middle housing 12 is easy to form, and the reduction gear 50 and the output shaft 60 can be supported stably since the front housing 11 has high rigidity. Since the linear expansion difference is large between the middle housing 12, and the stator 30 and the front housing 11, strong stress may act between the middle housing 12, and the stator 30 and the front housing 11. As mentioned above, in this embodiment, the stress produced among the middle housing 12, the front housing 11, and the stator 30 can be reduced while the coefficient of linear expansion is different among the components. Therefore, the axial misalignment between the components can be controlled, while the middle housing 12 is formed easily, and while the reduction gear 50 and the output shaft 60 are stably supported.

Second Embodiment

Figure 15:
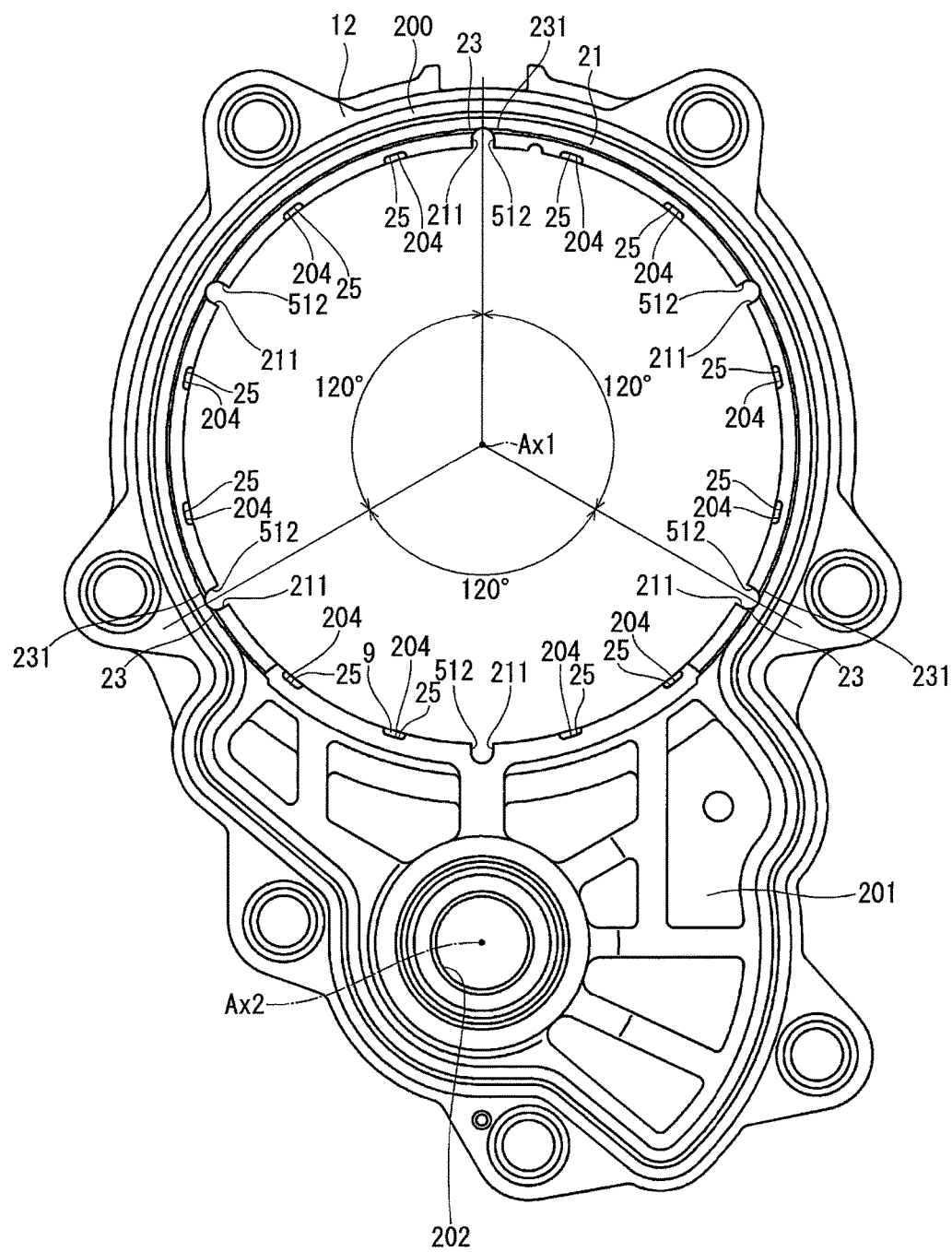
FIG. 15 is a view illustrating a middle housing of a rotation drive device according to a second embodiment seen from a front housing side.
Figure 16:
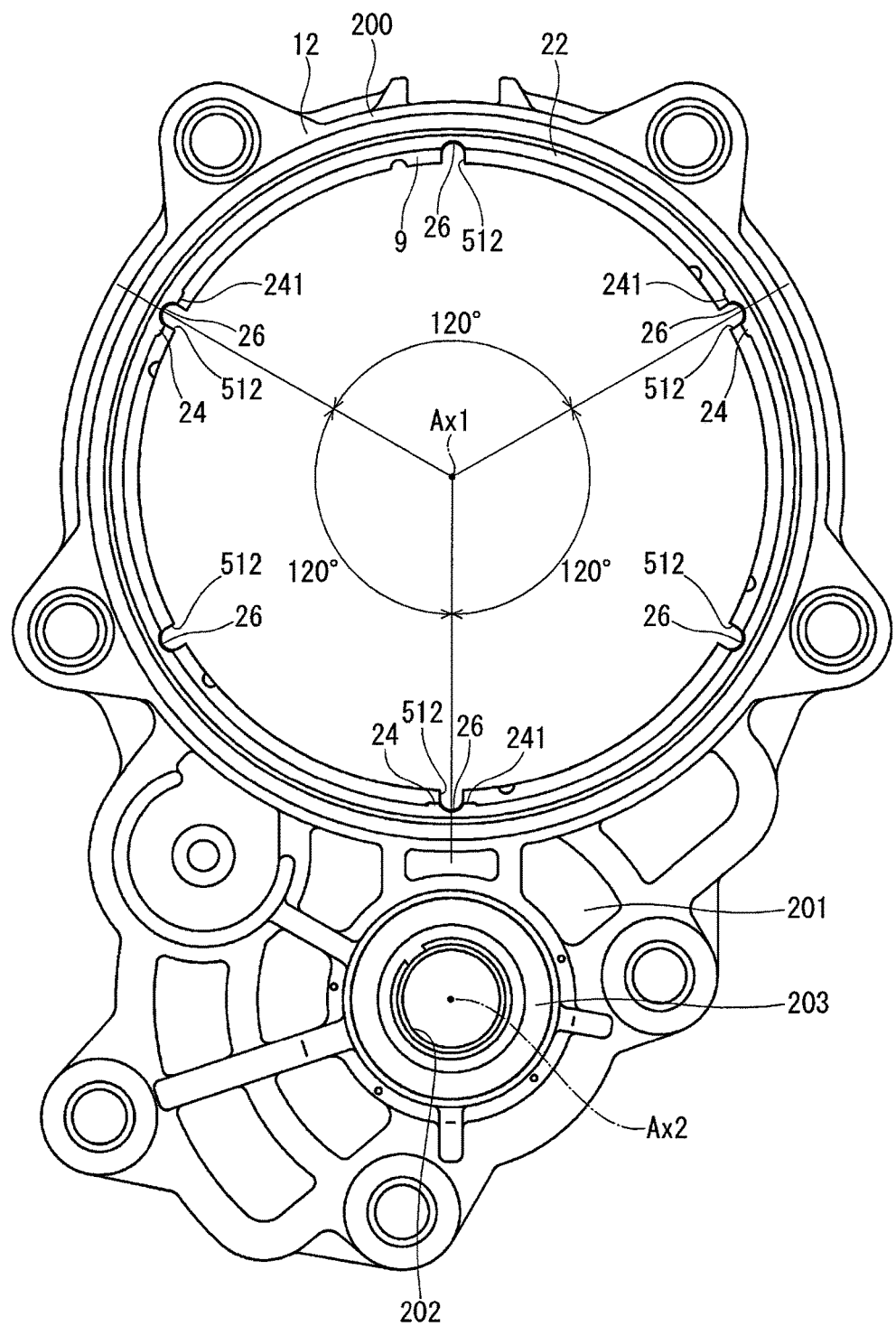
FIG. 16 is a view illustrating the middle housing of the rotation drive device of the second embodiment seen from a rear housing side.

A part of a rotary actuator according to a second embodiment is shown in FIGS. 15 and 16. The second embodiment differs from the first embodiment in the configuration of the middle housing 12.

As shown in FIG. 15, the front side convex part 23 is formed at three locations at interval of about 120 degrees in the circumferential direction of the front side extension part 21. In detail, the front side convex part 23 is formed at the ends and the center of the front side extension part 21 in the circumferential direction. The front side convex part 23 is formed on the front side extension parts 21 at the position corresponding to the groove portion 512 of the plate 9. In this embodiment, at least one of the three front side convex parts 23 is in contact with the cylinder wall 112. Each of the three front side convex parts 23 is divided at the center (refer to FIG. 15). That is, each of the three front side convex parts 23 is divided into two parts in the circumferential direction of the front side extension part 21.

As shown in FIG. 16, the rear side convex part 24 is formed at three locations with interval of about 120 degrees in the circumferential direction of the rear side extension part 22. Specifically, the rear side convex part 24 is formed at the position corresponding to the center between the two front side convex parts 23. In this embodiment, at least one of the three rear side convex parts 24 is in contact with the curved surface 351. Each of the three rear side convex parts 24 is divided by the rear side concave portion 26 at the center (refer to FIG. 16). That is, each of the three rear side convex parts 24 is divided into two parts in the circumferential direction of the rear side extension part 22. The other configuration in the second embodiment is the same as that of the first embodiment.

According to the present embodiment, at least one of the rear side convex parts 24 is divided in the circumferential direction of the rear side extension part 22. Therefore, the rigidity of the rear side convex part 24 can be reduced, and the stress caused by the linear expansion difference between the middle housing 12 and the stator 30 can be further reduced. Thereby, the axial misalignment which may be generated between the motor shaft 45, the stator 30, and the reduction gear 50 and the output shaft 60 can be further restricted.

According to the present embodiment, the three front side convex parts 23 are formed in the circumferential direction of the front side extension part 21 at regular intervals. Therefore, the middle housing 12 and the front housing 11 can be engaged with each other stably by the front side convex part 23. Thereby, the axial misalignment between the middle housing 12 and the front housing 11 can be further restricted. Moreover, compared with the first embodiment equipped with the five front side convex parts 23, the front side convex part 23 can be easily formed.

According to the present embodiment, the three rear side convex parts 24 are formed in the circumferential direction of the rear side extension part 22 at regular intervals. Therefore, the middle housing 12 and the stator 30 can be engaged with each other stably by the rear side convex part 24. Thereby, the axial misalignment between the middle housing 12 and the stator 30 can be further restricted. Moreover, compared with the first embodiment equipped with the six rear side convex parts 24, the rear side convex part 24 can be easily formed.

Other Embodiment

At least one of the plural front side convex parts 23 does not need to be divided in the circumferential direction of the front side extension part 21.

The front side convex part 23 does not need to be formed in the circumferential direction of the front side extension part 21 at equal intervals. The number of the front side convex parts 23 formed in the circumferential direction of the front side extension part 21 is not limited. However, it is desirable to provide three or more front side convex parts 23.

The rear side convex part 24 does not need to be formed in the circumferential direction of the rear side extension part 22 at equal intervals. The number of the rear side convex parts 24 formed in the circumferential direction of the rear side extension part 22 is not limited. However, it is desirable to provide three or more rear side convex parts 24. The number of the front side concave portions 25 formed in the middle housing 12 is not limited. The middle housing 12 does not need to have the front side concave portion 25.

The middle housing 12 may be formed of materials other than resin. The front housing 11 may be formed of materials other than metal. The present disclosure is suitably applied to the configuration in which a coefficient of linear expansion differs among the middle housing 12, the front housing 11, and the stator 30. The compulsive drive shaft 160 may be not provided.

The output unit 86 may be formed in the front housing 11. The manual shaft 101 may be connected to the output unit 86 adjacent to the front housing 11, and the output unit 86 may output torque at the side adjacent to the front housing 11. The gear mechanism may have a speed up gears increasing the speed of torque instead of the reduction gear 50. The rotational electric machinery may be a motor other than the three-phase brushless motor. The number of the concave portions defined in the detent plate is not limited. That is, the number of the ranges of the automatic shift to which the present disclosure is applied is not restricted to four.

The shift-by-wire system may be used for switching the range of, for example, a parking mechanism of EV (electric vehicle) or HV (hybrid vehicle), between two positions of "P" or "notP", other than a gearless drive mechanism (CVT) which is changed among four positions of "P", "R", "N", and "D" or the automatic shift (A/T) of HV, like the above-mentioned embodiment. The rotary actuator may be applied to an equipment other than the shift range transfer device of the shift-by-wire system for a vehicle, or the parking transfer device, as a target for drive or attachment.

Such changes and modifications are to be understood as being within the scope of the present disclosure as defined by the appended claims.

What is claimed is:

1. A rotary actuator comprising:
a front housing;
a middle housing disposed at an opening of the front housing;
a rear housing disposed opposite from the front housing with respect to the middle housing to define a space with the front housing and the middle housing;
a motor shaft having ends rotatably supported by the front housing and the rear housing;
a stator fixed at an inner side of the rear housing in the space;
a rotor disposed at an inner side of the stator to be rotatable with the motor shaft;
a gear mechanism located adjacent to the front housing relative to the stator and the rotor in the space to transmit a torque of the motor shaft; and
an output gear mechanism disposed to be rotatable to output the torque of the motor shaft transmitted by the gear mechanism, wherein
the middle housing has
an annular part disposed at an outer side of the gear mechanism in the radial direction,
a front side extension part extending from the annular part in a cylindrical shape toward the front housing and located at an outer side of the gear mechanism in the radial direction,
a rear side extension part extending from the annular part in a cylindrical shape toward the rear housing and located at an outer side of the stator in the radial direction,
a plurality of front side convex parts projected from an outer circumference wall of the front side extension part outward in the radial direction to be in contact with an inner wall of the front housing, and
a plurality of rear side convex parts projected from an inner circumference wall of the rear side extension part inward in the radial direction to be in contact with an outer edge part of the stator.

2. The rotary actuator according to claim 1, wherein at least one of the plurality of front side convex parts is divided in a circumferential direction of the front side extension part.

3. The rotary actuator according to claim 1, wherein at least one of the plurality of rear side convex parts is divided in a circumferential direction of the rear side extension part.

4. The rotary actuator according to claim 1, wherein the front side convex part is defined at three locations in a circumferential direction of the front side extension part at a regular interval.

5. The rotary actuator according to claim 1, wherein the rear side convex part is defined at three locations in a circumferential direction of the rear side extension part at a regular interval.

6. The rotary actuator according to claim 1, wherein
the middle housing further has at least one front side concave portion recessed from the inner circumference wall of the front side extension part outward in the radial direction.

7. The rotary actuator according to claim 1, wherein
the middle housing is made of resin, and
the stator and the front housing are made of metal.

* * * * *